United States Patent [19]

Haytayan

[11] 4,106,619
[45] Aug. 15, 1978

[54] NAIL CLIPS

[75] Inventor: Harry M. Haytayan, Lincoln, Mass.

[73] Assignee: Pneutek, Inc., Billerica, Mass.

[21] Appl. No.: 835,500

[22] Filed: Sep. 22, 1977

Related U.S. Application Data

[63] Continuation of Ser. No. 715,856, Aug. 19, 1976, abandoned.

[51] Int. Cl.² .............................................. B65D 85/24
[52] U.S. Cl. .................................. 206/346; 206/383; 206/820
[58] Field of Search ............... 206/338, 343, 345, 346, 206/347, 383, 820, 330, 332, 382

[56] References Cited

U.S. PATENT DOCUMENTS

| | | | |
|---|---|---|---|
| 2,012,615 | 8/1935 | Mason | 206/343 |
| 2,954,602 | 10/1960 | Derby | 206/343 |
| 3,645,164 | 2/1972 | Wurth | 206/343 |
| 3,904,032 | 9/1975 | Maier | 206/347 |
| 3,927,459 | 12/1975 | Haytayan | 206/347 |
| 3,977,522 | 8/1976 | Aker et al. | 206/330 |
| 4,019,631 | 4/1977 | Lejdegard | 206/347 |
| 4,047,611 | 9/1977 | Damratowski | 206/347 |

FOREIGN PATENT DOCUMENTS 1,957,930  6/1971  Fed. Rep. of Germany .......... 206/347

Primary Examiner—Steven E. Lipman
Assistant Examiner—Bruce H. Bernstein
Attorney, Agent, or Firm—Schiller & Pandiscio

[57] ABSTRACT

A novel nail clip is provided for use with power actuated drivers. Each clip comprises a plurality of impact fasteners each having a flange intermediate its ends, and a strip consisting of a plurality of serially connected fastener-supporting members each surrounding and supporting the driving or impact end of a separate fastener. The strip is formed to facilitate the shearing off of said fastener-supporting members singly in response to shearing forces produced when each member and the fastener which it supports are impacted by the hammer of a driver tool.

16 Claims, 15 Drawing Figures

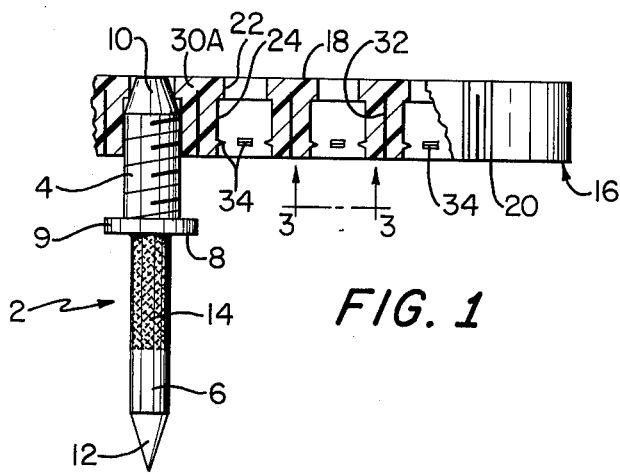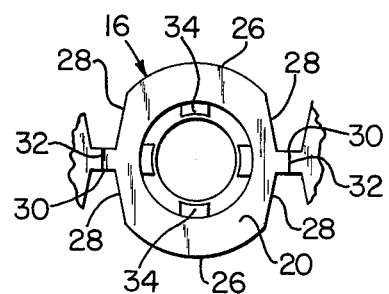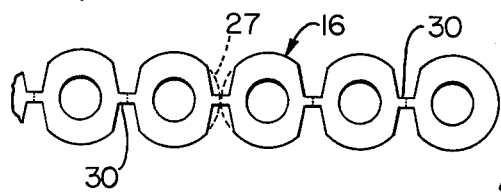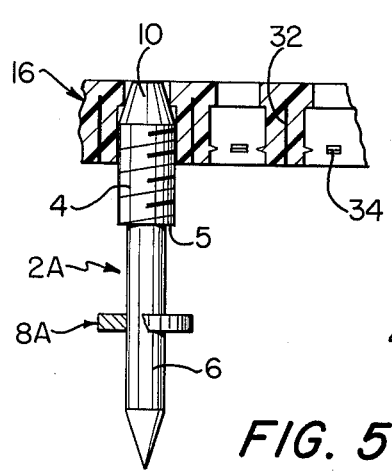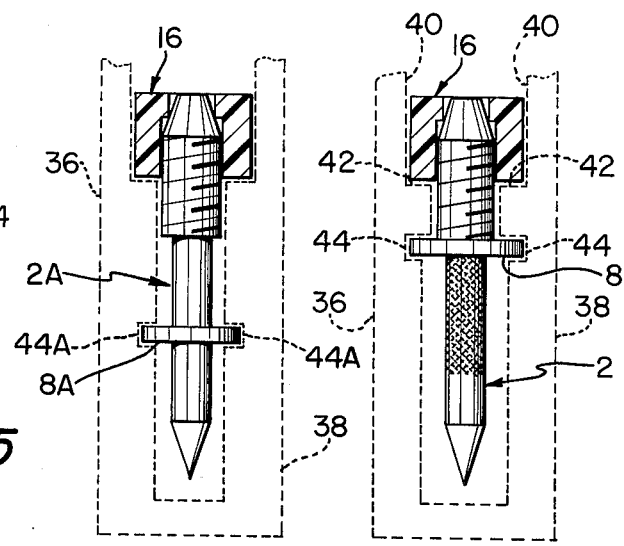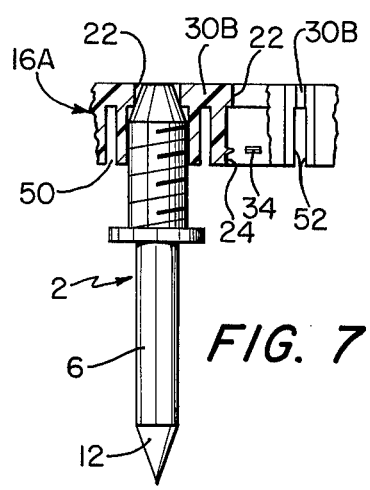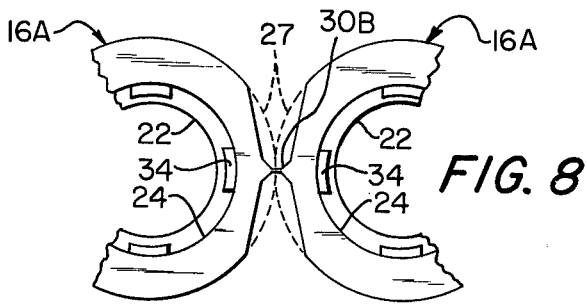

NAIL CLIPS

This application is a continuation of our copending application Ser. No. 715856 filed Aug. 19, 1976 for Nail Clips, now abandoned.

This invention relates to nails with flanges intermediate their ends and more particular to provision of such fasteners in strip form for use with power driven impact tools.

A number of impact tools have been designed for driving nails and other fasteners into wood, metal, concrete and other materials with the fasteners being supplied to the tool from a magazine. Such tools generally consist of a guide track in the form of a bore along which a hammer or driver is reciprocated, and a side opening whereby fasteners may be introduced one by one into the hammer bore in position to be intercepted and driven by the hammer when the latter undergoes its drive stroke. While it is possible to load a magazine with nail-type fasteners on a one by one basis, it is appreciated that loading would be facilitated if the fasteners could be pre-assembled as a clip which could be inserted quickly and easily in the manner that clips of cartridges are installed in an automatic rifle, or strips of staples are installed in a stapling machine.

While some fasteners such as conventional U-shaped staples have already been satisfactorily assembled in strip form, problems have arisen with respect to feeding strips of flanged nails and other types of impact fasteners which have flanges intermediate their ends, particularly where the flange diameter exceeds all other diameters of the fastener.

One major problem is maintaining perpendicularity and alignment of the fasteners as they are being fed from the magazine into the guide track of the impacting tool and also as they are detached and driven along the guide track under the influence of the hammer so as to assure that the fasteners will feed easily and without jamming. Another major problem is how to couple a number of the fasteners together in series so as to form a clip which not only provides the needed perpendicularity during feeding but also is adapted to permit the leading fastener to be detached by the hammer without jamming the tool and with only a small expense of energy, so that the fastener can be driven accurately with the full force for which the tool is designed. By way of example, prior to this invention, impact-driven fasteners of the type comprising a shank with a peripheral flange on the shank intermediate its ends and a threaded section on the shank between the flange and one of its ends, hereinafter called "hanger fasteners", have not been available commercially in clips suitable for use in magazine-fed drivers. This type of fastener has wide use in the building trades industry for attaching various types of members to concrete ceilings. The flange serves to limit the depth to which the fastener may be driven into the concrete ceiling so that the threaded section of the fastener will remain accessible for attachment of members such as lighting fixtures, channel and pipe-supporting brackets, and other building hardware.

The present invention also is concerned with solving a problem characteristic of hanger fasteners. Heretofore, such fasteners have usually been driven by powder-type drivers, i.e., drivers which rely on an explosive cartridge to provide the force required to drive a nail into a concrete ceiling or other building or structural member of concrete, steel or other materials. However, conventional hanger fasteners comprise a ring or flange which surrounds and grips the shank of the fasteners at a point spaced from the threaded section of the shank. When such fasteners are driven with proper force, the flanges are forced back along the shanks up to the threaded sections, where they stop and then act as a fixed part of the fasteners to limit the penetration of the shank into a workpiece. However, in practice, it is not uncommon for operators in the field to use an oversized explosive charge to drive the fasteners, with the result that the fasteners are driven in so far as to force the ring flanges to ride up over the threaded sections of the shanks and cause a substantial portion of the threaded sections to be embedded or submerged in the workpiece.

Accordingly the primary object of this invention is to provide new forms of clips of fasteners comprising a series of flanged fasteners which are designed for use with power driven impact tools, with the flanged fasteners being mounted to and retained by a supporting strip which is constructed so as to substantially eliminate any tendency of the fasteners to jam in the impact tool and allows each fastener to be detached easily from the clip by the impact force of the tool's hammer and to be driven accurately and at high velocity with the full force for which the tool is designed.

A further object is to provide a clip of the character described which is designed to be slidably supported in a magazine so that it will not shift its position as a result of tool recoil, thereby minimizing the possibility of the fasteners jamming in the magazine or in the aperture through which the fasteners are fed from the magazine to the bore in which the hammer reciprocates.

A more specific object is to provide a clip of the character described wherein the supporting strip consists of a plurality of fastener-holding collars or caps which are desigend to be easily detached from one another when the fastener is fired into a workpiece. A further object is to provide a supporting strip consisting of a number of nail-holding collars or caps which are designed to be separated from the fasteners when the fasteners are fired into a workpiece.

These objects are achieved by providing a clip comprising: a supporting strip consisting of a series of fastener-supporting elements in the form of collars or caps; a plurality of fasteners each having one end portion secured in a fastener-supporting element and a flange intermediate its ends; and a connection between each pair of fastener-supporting elements designed to facilitate detachment of the fastener-supporting elements singly and in sequence in response to a shearing force produced when a fastener is impacted by a hammer of an impact tool. The connection between each pair of fastener-supporting elements is in the form of a web which is designed to be sheared in two by the hammer of the tool acting on the leading fastener. The fastener-supporting members are disposed with respect to one another so that the center-to-center distance between the portions of the fasteners which are supported by the supporting strip is substantially the same as the center-to-center distance of the fasteners in the region of the flanges when the flanges are in contact with one another.

Other objects, advantages, and features of the invention are disclosed or rendered obvious by the following detailed description which is to be considered together with the accompanying drawing wherein:

FIG. 1 is a side elevation, partly in section, of a preferred form of nail supporting strip provided in accordance with this invention;

FIG. 2 is a plan view of the strip of FIG. 1;

FIG. 3 is a bottom view of one of the nail supporting elements making up the strip of FIG. 1;

FIG. 4 is a cross-sectional view showing how the clip of FIG. 1 is mounted and guided in a magazine;

FIG. 5 is a view like FIG. 1 of a modification of the invention;

FIG. 6 is a view like FIG. 4 showing the nail clip of FIG. 5 disposed in a magazine;

FIG. 7 is a view like FIG. 1 of another modification of the invention;

FIG. 8 is a plan view of the clip of FIG. 7;

Figure 9:
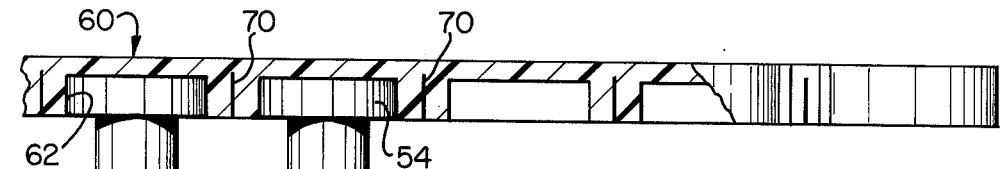
FIG. 9 is a view like FIG. 1 of another embodiment of the invention.

Unless otherwise stated or indicated, like numerals are used to refer to like parts in the several figures of the drawing. Also as used herein the term "nail" is intended to embrace various types of impact fasteners, i.e., fasteners that are driven or started into a workpiece by impact, and so, unless otherwise indicated herein, "flanged impact fasteners" shall be deemed to include flanged studs and rivets, both threaded and unthreaded, as well as different types of nails with flanges intermediate their ends.

Referring now to FIGS. 1-3, there is shown a preferred form of nail clip which (a) embodies a novel form of hanger fastener having a peripheral flange and a threaded section and (b) is designed to be loaded into a magazine of the type having track or rail means for supporting the clip and guiding it forward toward the hammer guide bore of an impact tool under the influence of a pusher associated with the magazine (such magazines are already known as shown, for example, by U.S. Pat. Nos. 2,923,937, 3,498,517, 3,523,489, 3,711,008 and 3,952,398). More specifically, the clip shown in FIGS. 1-3 comprise fasteners or nails 2 having a first threaded body or shank section 4, a second unthreaded body or shank section 6, and a circular flange 8 located at the juncture of the threaded and the unthreaded sections. The edge of flange 8 is preferably a flat surface 9 as shown. The upper end of the fastener may but need not be frusto conical in shape as shown at 10, while the bottom end of the fastener is provided with a pointed portion 12 to facilitate driving the fastener into a workpiece. The flange 8 is an integral part of the shank or body and, therefore, its position is fixed with respect to the threaded section. This particular form of fastener is believed to be new and, as one skilled in the art will appreciate, this type of fastener with an integral flange and a threaded section can be easily produced on conventional nail and stud making machinery. The exterior surface of shank section 6 may be smooth or some or all of it may be roughened, e.g., by knurling as shown at 14, for increased holding power.

The supporting strip for the fasteners 2 consists of a plurality of identical collars or sleeves 16 that are connected to one another so as to form an integral unit. The nail supporting strip may be made of a frangible metal, but preferably the sleeves are molded of a plastic material. The plastic may be a thermoplastic or thermosetting material consisting of a homopolymer, copolymer, a mixture of polymers, etc., as will be obvious to a person skilled in the art. In any event, the strip is made of a material which has a resiliency that permits the collars to be press-fitted onto and make a friction grip with the threaded shank sections 4. By way of example, a low density polyethylene having a durometer of about 50A is preferred, but polypropylene, nylon, Teflon ® and polyurethanes of comparable resiliency also may be used. The clips may be made in any convenient length, e.g., each supporting strip may consist of ten collars 16.

As seen in FIGS. 2 and 3, the outer surface of each collar is cylindrical, except as hereinafter described, and the upper and lower ends surfaces 18 and 20 are made flat. Additionally, each collar is provided with an axial bore 22 which is enlarged by a relatively long counterbore 24. Bores 22 and counterbores 24 are sized so that each collar 16 will make a friction tight grip with the tapered section 10 and the threaded section 4 of the associated fastener. The radius of curvature of the outer surface 26 of each sleeve is substantially the same as the radius of curvature of the flanges 8 of the fasteners, whereby the peripheral surface 9 of each flange and the outer surface 26 of the associated sleeve correspond to axially separated portions of the same cylinder. This matching of flange and collar diameters is designed to assure proper guidance of the nail as it is being driven as hereinafter described.

The radius of curvature of the outer surfaces 26 is set so that if those outer surfaces were continued at the same curvature about the full periphery of each sleeve, each surface 26 would be substantially tangent (i.e. tangent or nearly tangent) to the corresponding surface of each adjacent sleeve, in the manner indicated in FIG. 2 where the broken lines 27 represent extensions of the profiles of surfaces 26. Instead, however, for ease of manufacture the surfaces 26 are cut back, preferably in the form of flats 28 on either side of the line of mutual tangency, thereby leaving a narrow web 30.

The web is made relatively thin, but not so thin that the sleeves can be pulled apart using moderate manual force. Significantly, each web is characterized by a fracture line 32 which commences at the bottom end of the web and terminates short of the upper end of the web, so that a short section 30A of the web is intact. It is to be understood that the term "fracture line" means that the web 30 is actually divided into two parts along that line with substantially no gap between the two parts. Preferably the fracture line is a razor cut and is formed by severing the web with a cutting tool having a very thin and sharp cutting section comparable to that of a conventional disposable shaving razor blade. The fracture line plane preferably extends at substantially a right angle to the plane of the web, as shown in phantom by the dotted line in FIG. 2, so that the confronting edges of the two parts formed by the fracture line are flat, extend at a right angle to the plane of the strip, and fully engage one another. As a consequence one part of the severed web serves to support the other confronting part to prevent one collar from being inclined with respect to the adjacent collar. The length of the fracture line 32 is variable with consideration given to whether the webs are coextensive with the sleeves, but in any event it is set so that a predetermined amount of force is required to separate one sleeve from an adjacent sleeve by shearing the intact portion 30A of the web as hereinafter described. Preferably, but not necessarily, the fracture line extends for at least one half of the height of the web, where the web extends for the full length of the sleeves. The webs 30 may be coextensive with the full height of the sleeves as shown, or they may be cut for short distances at the top and/or bottom without materially imparing the performance of the nail clip when used in an impact driver tool.

The grip between the collars and the fasteners is improved by molding a plurality of small fingers 34 on the inner surface of each collar. The inner edge of each finger is made narrow (preferably it is tapered as shown) so that the finger will be able to interlock with the screw thread on the threaded portion 4 of the fastener. While the number and location of the fingers may be varied, it is preferred that each collar have four equally spaced fingers and that the fingers be located at or close to the lower end of the collars, as shown in FIGS. 1 and 3. Preferably also the fingers all lie in a common plane extending at a right angle to the axis of bore 22. If desired, an additional set of fingers may be provided between the ones shown and the upper end of the collar. Also fingers 34 may be replaced by a single rib of similar cross-section which extends for the full circumference of counterbore 24.

With or without the fingers 34, collars 16 are made so as to grip the threaded sections of the fasteners with a force which is approximately as large and preferably greater than the amount of force required to be exerted on a collar in order to cause that collar to be sheared off from the adjacent collar as later described. In this connection it is contemplated that flange 8 will be sized to make a close sliding fit in the hammer guide bore of the driving tool and the hammer will have a flat end with a diameter larger than the diameter of bore 22 and preferably the same as or slightly smaller than the outer diameter of the collars (i.e., the diametrical distance between opposed surfaces 26 in FIG. 3).

In use the nail clip is inserted into a magazine or holder associated with a power driven impact tool, such as one shown in U.S. Pat. Nos. 3,711,008 or 3,952,398, and is mounted so that it is slidable in the magazine. In this connection it is contemplated that the magazine (shown in phantom in FIG. 4) will have a pair of side walls or guides 36 and 38 which are shaped so that they have opposed surfaces 40 that are spaced from one another to make a sliding fit with the curved surfaces of collars 16, shoulders 42 that slidably support the collars and grooves 44 that make a close sliding fit with flanges 8. The vertical dimension of grooves 44 (as seen in FIG. 4) is just enough to assure that the clip is free to slide lengthwise of the magazine but is restrained against excessive relative vertical movement. As noted earlier, it is contemplated that the power driven impact tool will have a round nail-receiving hammer guide bore with a diameter only slightly larger than the diameter of collar 16, plus a side opening through which the leading collar and associated fastener of the nail clip can be advanced into the hammer bore. It is contemplated also that the tool will be designed so that when one collar with its associated fastener is disposed in the hammer bore in position to be driven by the hammer, the next collar with its fastener is positioned in the side opening of the tool and is restrained against vertical movement by the interlocking of its flange with the grooves 44 or corresponding restraining means forming part of the contour of the side opening. In the usual case the magazine will include a spring-biased pusher which indexes the nail clip forward to place a new collar and fastener in the hammer guide bore following each complete nail-driving cycle of the hammer. When the hammer undergoes its nail driving stroke, it impacts the upper end surfaces of the fastener and supporting collar which lies in its path and drives those two elements downward with sufficient force to shear the web portion 30A that is connected to the collar that is next in line. The web portion 30A is sheared in two along a line which is more or less a continuation of fracture line 32. As the severed collar and its associated nail are driven down by the hammer, the collar and flange 8 cooperate with the surrounding wall of the hammer bore to keep the fastener aligned with the hammer bore as it is driven into the workpiece. Unless it is the first one in the clip, the severed collar has one-half of a web 30 extending along its length at two diametrically opposed points. These two web portions also cooperate with the flange 8 and the circularly curved surfaces 26 of the collar to prevent the fastener from becomming misaligned in the hammer bore. Thus, the fastener cannot tilt in the hammer bore and will not jam. Jamming of the nail clip in the magazine at the side opening to the hammer guide bore is minimized by the fact that the flat confronting edges along the length of the fracture line 32 engage each other as the sleeves are advanced along the length of the magazine.

Nail drivers with nail clips made as shown in FIGS. 1–4 may be operated at the rate of 20 nails/minute without jamming. A nail strip as shown in FIGS. 1–4 is particularly advantageous in avoiding jamming where the nails have a length in the order of two inches. For such nails satisfactory results are achieved using plastic collars of the type shown with a height of approximately ⅜ inch. Having the bore 22 form a hole in the upper end surface 18 of the collar and making the collar terminate short of flange 8 is advantageous in that it facilitates removal of the collar from the fastener after it has been driven into the workpiece. Also the flange 8 stops the fastener from penetrating the workpiece too far. In some cases the collar may come free of the driven nail as a result of reaction expansion as it clears the discharge end of the nozzle.

FIGS. 5 and 6 show a nail clip which includes a different fastener. In this case the fastener 2A is identical to the fastener of FIG. 1 except that the flange 8A is performed as a separate ring and forced onto the fastener so that it is spaced from the threaded sections 4. The latter has a flat annular end surface 5. The clip of FIG. 5 is preferably used with a magazine which is the same as the one shown in FIG. 4 except that the flange 8A is received and guided by two grooves 44A which are located lower than grooves 44. Assuming that the clip of FIG. 5 is installed in a magazine of and used by a pneumatic driver of the type shown in the aforementioned U.S. patents in the manner of the clip of FIG. 1, as each fastener is driven into a workpiece, e.g., a concrete ceiling or wall, the flange 8 will be forced along the lower section 6 of the fastener's shank until it is intercepted by the flat end surface 5 of the threaded portion, whereupon it will act as a stop to terminate the penetrating movement of the fastener.

FIGS. 7 and 8 illustrate a modification of the invention. In this case the caps or sleeves 16A are identical to sleeves 16 previously described except that the connection is notched over a substantial portion of its height as shown at 50 instead of having a razor slit, thereby leaving an integral web section 30B and flat confronting and mutually spaced surfaces 52. Additionally the web section 30B is weakened by making it relatively thin in the region of notch 50, as shown in FIG. 8. The thin and relatively short web sections 30B are strong enough to hold the collars 16A as an integral strip, yet are weak enough to be easily sheared into two when the first-in-line fastener of the clip is impacted by the hammer of a driver tool as described in connection with FIGS. 1–4. Of course, the radial dimensions of collars 16A relative to the fasteners 2 are the same as those of collars 16, with the result that the clip of FIGS. 7 and 8 may be installed in the same magazine as the clip of FIGS. 1–3. Obviously fasteners 2A also may be combined with collars 16A.

Figure 10:
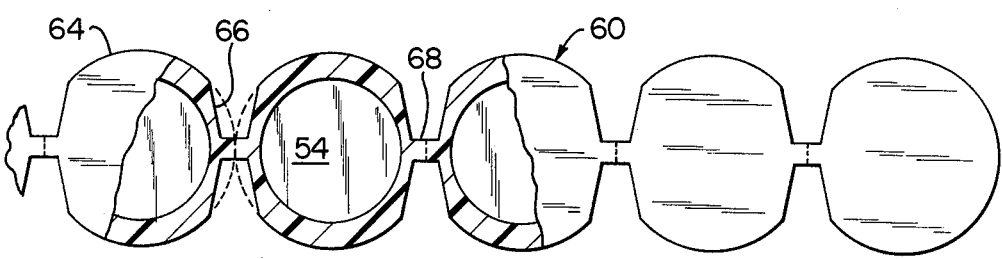
FIG. 10 is a plan view, partly in section of the clip of FIG. 9.
Figure 11:
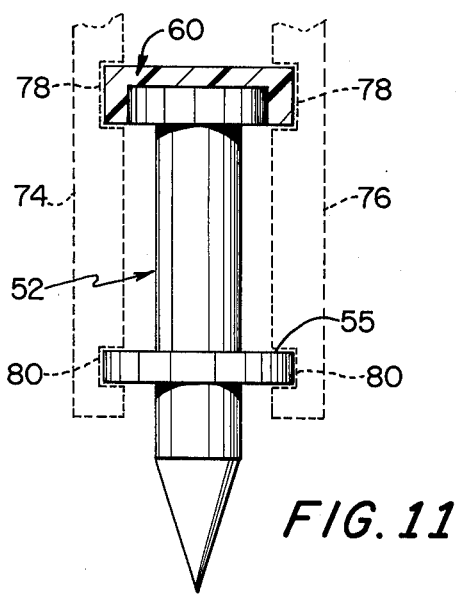
FIG. 11 illustrates the clip of FIG. 9 in a magazine.

FIGS. 9–11 illustrate still another modification of the invention. In this case the fasteners are nails 52 having shanks 53, heads 54 and flanges 55, with pointed ends 56. Flanges 55 have flat edges 58 and may be formed integral with shanks 53, but more commonly each flange 55 is formed as a separate element and attached to the shanks by a friction fit, with the result that it serves as a guide for the fastener as the latter is propelled along the hammer guide bore and then, as the fastener is driven into a workpiece, it is forced back along the shank far enough to engage and serve as a reinforcement for head 54. The fasteners are mounted in a strip comprising a plurality of caps 60 which frictionally embrace the heads 54. Caps 60 are similar to collars 16 except that they have blind cavities 62 which are sized to accomodate and frictionally grip the cylindrical nail heads 54. As seen in FIG. 10, caps 60 have circularly curved surfaces 64 and flat surfaces 66 which conform to surfaces 26 and 28 of collars 16, and they are connected by webs 68 which correspond to webs 30 and have a razor slit 70 like razor slits 32. The radius of flanges 58 is the same as the radius of curvature of surfaces 64, with the result that when the two parts of each web 68 engage each other along slits 70, the flanges 58 of the nails held by the two caps which are connected by the web also engage each other in the manner shown in FIG. 9. The clip of FIGS. 9 and 10 is used preferably with a magazine as shown in FIG. 11. The magazine has opposite side walls 74 and 76 with a first matching set of grooves 78 to slidably accommodate the caps 60 and a second set of grooves 80 to slidably accommodate the flanges 55. It is to be appreciated that the primary difference between caps 60 and collars 16 is that the former cover the upper ends of the fasteners, and that collars 16 could be modified so as to cover the upper ends of fasteners 2 and 2A.

Figure 13:
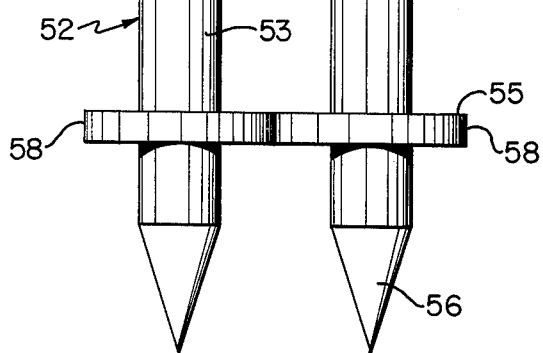
FIG. 13 is a fragmentary plan view of the strip of FIG. 12.
Figure 12:
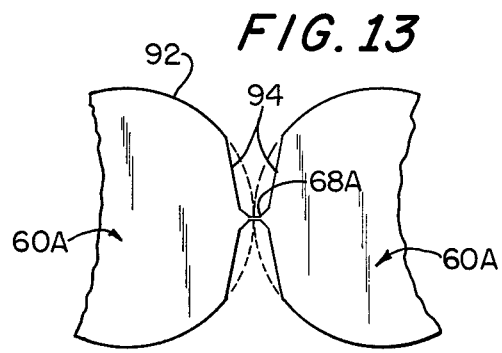
FIG. 12 is a sectional view in elevation of a modified form of supporting strip.

FIGS. 12 and 13 show a modification of the clip of FIGS. 9–11 which is comparable to the modification of FIGS. 7 and 8. In this case the strip comprises caps 60A which are connected by webs 68A which are weakened by notches or slots 90 which may be similar to notches 50 but preferably are triangular in vertical cross-section as shown in FIG. 12. Webs 68A are made relatively thin like webs 30B shown in FIG. 8. The outer surfaces 92 and 94 of caps 60A correspond to the surfaces 26 and 28 respectively of collars 16 as shown in FIG. 3.

Figure 14:
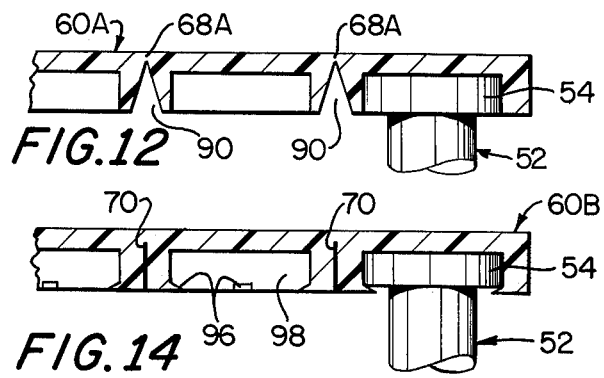
FIG. 14 is a sectional view in elevation of another form of supporting strip.
Figure 15:
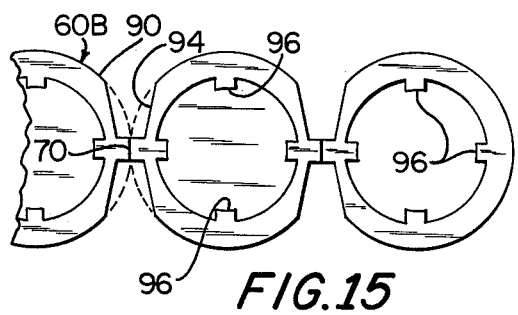
FIG. 15 is a bottom view of the strip of FIG. 14.

FIGS. 14 and 15 show still another modification of the invention. In this case fasteners 52 are mounted in a strip of caps 60B which are like caps 60 except that each cap is molded with a plurality of detents or fingers 96 at the lower edge of its inside cylindrical surface 98. Fingers 96 engage the underside of nail heads 56 and thereby assist in holding the nails to caps 60B.

Still other modifications and variations of this invention will be obvious to persons skilled in the art.

What is claimed is:

1. A clip of fasteners comprising (1) a support strip for supporting a plurality of fasteners in parallel and in series with one another and (2) a plurality of like fasteners supported by said support strip;

said support strip being made of a plastic material and comprising a plurality of like parallel fastener-supporting elements and a plurality of webs each connecting a pair of mutually adjacent fastener-supporting elements, each of said fastener-supporting elements havig a circularly-curved outer surface;

said fasteners each comprising an elongate metal body having first and second opposite ends and a peripheral metal flange surrounding and carried by said body at a selected position intermediate its ends, each of said flanges having a circularly curved outer edge surface having substantially the same radius of curvature as said outer surfaces, each fastener body being pointed at its second end and also being threaded over at least a portion of its length between its first end and the flange which it carries;

each of said bodies being surrounded and gripped at its first end by one of said fastener-supporting elements with the center-to-center distance between each pair of fasteners at said first ends being substantially the same as the center-to-center distance between the same pair of fasteners at the flanges thereof when said flanges are in engagement with each other, each of said fasteners being formed separately from said support strip and also from one another and the flange of each fastener being unattached with respect the flange of each adjacent fastener, and each fastener-supporting element gripping at least a part of the threaded portion of the fastener which it supports.

2. A clip according to claim 1 wherein each flange is integral with the fastener body which carries it and each fastener body is provided with a rough surface between its second end and the flange which it carries.

3. A clip according to claim 1 wherein each flange and the body which carries it are integral with one another and the threaded portion of said body commences at said flange.

4. A clip according to claim 1 wherein each flange is a ring that is formed separately from the body which carries it and is spaced from the threaded portion of said body, the rings are secured directly to the bodies by a friction fit and each body has a shoulder at one end of its threaded portion for engagement by the ring which it carries when said ring is caused to move toward said threaded portion.

5. A clip according to claim 1 wherein each web has a weakened section extending generally lengthwise thereof parallel to the longitudinal axis of said elongate bodies so as to facilitate separation of one fastener supporting element from another by a shearing action.

6. A clip according to claim 5 wherein said webs are shorter than said fastener-supporting elements.

7. A clip of fasteners comprising (1) a plastic support strip for supporting a plurality of fasteners in parallel and in series with one another and (2) a plurality of like metal fasteners supported by said support strip, each of said metal fasteners being preformed separately from said support strip;

said support strip comprising a plurality of like parallel fastener-supporting elements and a plurality of webs each connecting a pair of mutually adjacent fastener-supporting elements, each of said fastener-supporting elements having a circularly curved outer surface, and said webs being relatively thin;

said fasteners each comprising an elongate metal body having first and second opposite ends and a peripheral metal flange surrounding and carried by said body at a selected position intermediate its ends, each of said flanges having a circularly curved outer edge surface having substantially the same radius of curvature as said outer surfaces;

each of said bodies having a reduced diameter at its second end and being threaded over at least a portion of its length between its first end and the flange which it carries;

each of said bodies having at least part of its threaded portion surrounded and gripped by one of said fastener-supporting elements with the center-to-center distance between each pair of fasteners at said first ends being substantially the same as the center-to-center distance between the same pair of fasteners at the flanges thereof when said flanges are in engagement with each other, the curved outer surface of each fastener-supporting element and the curved outer edge surface of the flange of the fastener supported by said each fastener-supporting element constituting axially-spaced portions of a common cylinder; and each faster-supporting element gripping the fastener supported thereby with a force at least as large as the force required to be exerted axially on one fastener-supporting element to shear the web connecting that one fastener-supporting element from the next adjacent fastener-supporting element.

8. A clip according to claim 7 wherein each fastener body is provided with a rough surface between its second end and the flange which it carries.

9. A clip according to claim 8 wherein each flange and the body which carries it are integral with one another.

10. A clip according to claim 7 wherein each flange is a ring formed separately from the body which carries it, and further where the rings are secured to the bodies by a friction fit.

11. A clip according to claim 7 wherein each web has a weakened section extending generally lengthwise thereof parallel to said elongate bodies so as to facilitate separation of one fastener-supporting element from another by a shearing action.

12. A clip of fasteners comprising (1) a support strip for supporting a plurality of fasteners in parallel and in series with one another and (2) a plurality of like fasteners supported by said support strip;

said support strip comprising a plurality of like parallel fastener-supporting elements and a plurality of webs each connecting a pair of mutually adjacent fastener-supporting elements, each of said fastener-supporting elements having a circularly-curved outer surface;

each of said webs having first and second ends corresponding in relative position to the first and second ends of said elongate bodies, with each web having a line fracture extending generally lengthwise from said second end thereof to a point short of said first end thereof;

said fasteners each comprising an elongate body having first and second opposite ends and a peripheral flange surrounding and carried by said body at a selected position intermediate its ends, each of said flanges having a circularly curved outer edge surface having substantially the same radius of curvature as said outer surfaces;

each of said bodies being surrounded and gripped at its first end by one of said fastener-supporting elements with the center-to-center distance between each pair of fasteners at said first ends being substantially the same as the center-to-center distance between the same pair of fasteners at the flanges thereof when said flanges are in engagement with each other, each of said fasteners being formed separately from said support strip and also from one another and the flange of each fastener being unattached with respect to the flange of each adjacent fastener.

13. A clip according to claim 12 wherein each line fracture divides a web into two parts having flat confronting edge surfaces with substantially no gap between said edge surfaces.

14. A clip according to claim 12 wherein said fasteners have heads at said first ends and said fastener-supporting elements are caps and cover the heads of said fasteners.

15. A clip of fasteners comprising (1) a plastic support strip for supporting a plurality of fasteners in parallel and in series with one another and (2) a plurality of like metal fasteners supported by said support strip, each of said metal fasteners being preformed separately from said support strip;

said support strip comprising a plurality of like parallel fastener-supporting elements and a plurality of webs each connecting a pair of mutually adjacent fastener-supporting elements, each of said fastener-supporting elements having a circularly curved outer surface;

said fasteners each comprising an elongate body having first and second opposite ends and a peripheral flange surrounding and carried by said body at a selected position intermediate its ends, each of said bodies being pointed at its second end, each of said flanges having a circularly curved outer edge surface having substantially the same radius of curvature as said outer surfaces;

each of said webs having first and second ends corresponding in relative position to the first and second ends of said elongate bodies, and each web having a line fracture extending generally lengthwise from said second end thereof to a point short of said first end thereof, each line fracture dividing a web into two parts having flat confronting edge surfaces with substantially no gap between said edge surfaces;

each of said bodies being surrounded and gripped at its first end by one of said fastener-supporting elements with the center-to-center distance between each pair of fasteners at said first ends being substantially the same as the center-to-center distance between the same pair of fasteners at the flanges thereof when said flanges are in engagement with each other; the curved outer surface of each fastener-supporting element and the curved outer surface of the flange of the fastener supported by said each fastener-supporting element constituting axially-spaced portions of a common cylinder; and each fastener-supporting element gripping the fastener supported thereby with a force at least as large as the force required to be exerted axially on one fastener-supporting element to shear the web connecting that one fastener-supporting element from the next adjacent fastener-supporting element.

16. A clip according to claim 15 wherein said fasteners have heads at said first ends and said fastener-supporting elements are caps and cover the heads of said fasteners.

* * * * *

UNITED STATES PATENT AND TRADEMARK OFFICE
CERTIFICATE OF CORRECTION

PATENT NO. : 4106619
DATED : August 15, 1978
INVENTOR(S) : Harry M. Haytayan

It is certified that error appears in the above—identified patent and that said Letters Patent are hereby corrected as shown below:

Claim 1, column 8, line 38, "to" should be after -- respect --.

Claim 7, column 9, line 34, "faster-supporting" should be -- fastener-supporting --.

Claim 14, column 10, line 26, "12" should be -- 13 --.

Signed and Sealed this

Thirteenth Day of February 1979

[SEAL]

Attest:

RUTH C. MASON
Attesting Officer

DONALD W. BANNER
Commissioner of Patents and Trademarks